US012782127B2

(12) United States Patent
Li et al.

(10) Patent No.: US 12,782,127 B2
(45) Date of Patent: Nov. 3, 2026

(54) HIGH PRECISION CHANNEL FLOW MEASUREMENT DEVICE AND METHOD BASED ON PRINCIPLE OF MULTI-POINT HEAD LOSS

(71) Applicant: Soil and Water Conservation Monitoring Center of Pearl River Basin, Pearl River Water Resources Commission of the Ministry of Water Resources, Guangzhou City (CN)

(72) Inventors: Hao Li, Guangzhou City (CN); Youwang Wu, Guangzhou City (CN); Kaimin Shu, Guangzhou City (CN); Zhipeng Li, Guangzhou City (CN); Haozhe Li, Guangzhou City (CN); Jun Huang, Guangzhou City (CN); Xuebing Jiang, Guangzhou City (CN); Xueyan Han, Guangzhou City (CN); Lu Bai, Guangzhou City (CN); Qiuye Sun, Guangzhou City (CN); Huiru Liu, Guangzhou City (CN); Jiaping Xiang, Guangzhou City (CN); Qing Liu, Guangzhou City (CN); Jiayi Hu, Guangzhou City (CN); Caixia Zang, Guangzhou City (CN)

(73) Assignee: Soil and Water Conservation Monitoring Center of Pearl River Basin, Pearl River Water Resources, Commission of the Ministry of Water Resources, Guangzhou City (CN)

( * ) Notice: Subject to any disclaimer, the term of this patent is extended or adjusted under 35 U.S.C. 154(b) by 284 days.

(21) Appl. No.: 18/384,676

(22) Filed: Oct. 27, 2023

(65) Prior Publication Data

US 2025/0076043 A1 Mar. 6, 2025

(30) Foreign Application Priority Data

Sep. 5, 2023 (CN) ......................... 202311143717.7

(51) Int. Cl.
*G01C 13/00* (2006.01)
*G01F 1/002* (2022.01)

(52) U.S. Cl.
CPC ........... *G01C 13/002* (2013.01); *G01F 1/002* (2013.01)

(58) Field of Classification Search
CPC ........ G01C 13/002; G01F 1/002; G01F 1/667
See application file for complete search history.

(56) References Cited

U.S. PATENT DOCUMENTS 4,320,665 A * 3/1982 Cain ......................... G01F 1/74 73/861.04

FOREIGN PATENT DOCUMENTS

| | | | |
|---|---|---|---|
| CN | 105222831 A | * | 1/2016 |
| CN | 211373724 U | * | 8/2020 |
| JP | 2009008567 A | * | 1/2009 |

* cited by examiner

*Primary Examiner* — Yossef Korang-Beheshti
(74) *Attorney, Agent, or Firm* — Bay State IP, LLC

(57) ABSTRACT

The present disclosure discloses a high precision channel flow measurement device and method based on a principle of multi-point head loss. A flow velocity of a designated position is acquired by using a flow measurement tube; the flow measurement tube is moved in a vertical direction through a convex sliding block and a motion guide pillar to measure the flow velocity at different measurement points on a measurement line; an overall flow measurement part is integrally ascended, that is, the motion guide pillar leaves a water body, in combination with a load bearing telescopic lifting frame; the overall flow measurement part integrally (Continued)

moves left and right in a longitudinal direction through a telescopic guide rod to reach a set position; the overall flow measurement part is integrally descended through the load bearing telescopic lifting frame, that is, the motion guide pillar enters the water body to acquire the flow velocity.

10 Claims, 4 Drawing Sheets

HIGH PRECISION CHANNEL FLOW MEASUREMENT DEVICE AND METHOD BASED ON PRINCIPLE OF MULTI-POINT HEAD LOSS

CROSS REFERENCE TO RELATED APPLICATION

This application claims the benefit of and takes priority from Chinese Patent Application No. 202311143717.7 filed on Sep. 5, 2023, the contents of which are herein incorporated by reference.

TECHNICAL FIELD

The present disclosure belongs to the technical field of water conservancy projects, and relates to a high precision channel flow measurement device based on a principle of multi-point head loss and a high precision channel flow measurement method based on a principle of multi-point head loss.

BACKGROUND

Flow rate is one of the most important hydrological characteristic values of rivers and channels. It is not only basic data of changes in a water volume and a water body, but also a key factor restricting the construction of water conservancy projects of the rivers and channels. In recent years, the shortage of water resources has become an important factor restricting the development of agriculture in China. With the continuous promotion of water-saving agriculture, rapid and precise measurement of the flow rate and the water volume is also gradually applied in large-scale irrigation areas. Performing real-time monitoring and scientific and effective management on water use of the channels is a development direction of irrigation areas, and is also an important measure for promoting the automation and information development of the irrigation areas. At present, the traditional flowmeter velocity-area method is mostly used for performing flow measurement on an open channel in a large-scale irrigation area. A measurement method is single. Moreover, this method has a large workload, takes a long time, has low efficiency, and cannot guarantee measurement accuracy. A relatively advanced flow measurement device adopts a principle that is basically consistent with that of a traditional device. However, there are problems of high cost and difficulty in ensuring measurement precision. Now, it is urgent to develop another method to check the accuracy of a flow velocity and improve the measurement precision of the flow velocity and the flow rate. It is crucial to find another method to perform the flow measurement on the open channel, and it is also an important foundation for implementing the strictest water resource management system in China. In view of this, the present disclosure is specially proposed.

SUMMARY

A purpose of the present disclosure is to provide a high precision channel flow measurement device based on a principle of multi-point head loss, which can realize precise measurement of the water flow rate of cross sections of different irrigation channels.

The purpose of the present disclosure is also to provide a high precision channel flow measurement method based on a principle of multi-point head loss.

A first technical solution adopted by the present disclosure is that a high precision channel flow measurement device based on a principle of multi-point head loss includes a pair of telescopic guide rods that can span and be fixed to two sides of a channel and are arranged horizontally. A T-shaped positioning sliding block is connected to the telescopic guide rod in a sliding and sleeving manner. A support rod perpendicular to the telescopic guide rod is fixed to the T-shaped positioning sliding block. Positioning wing plates are respectively fixed to two ends of the support rod. A motion guide pillar in a vertical direction is fixed below the positioning wing plate. A flow measurement tube parallel to the support rod is arranged between two groups of motion guide pillars. The flow measurement tube is communicated with two Pitot tubes for measuring heights of water heads. The Pitot tube vertically penetrates through the positioning wing plate upwards. An ultrasonic probe a is arranged at a top of the Pitot tube. A Micro Controller Unit (MCU) is also arranged at an upper part of the T-shaped positioning sliding block. The MCU is electrically connected to each of the ultrasonic probe a and a wireless operation controller.

The present disclosure has the characteristics that:

a positioning hole b is formed in the positioning wing plate, and the Pitot tube vertically penetrates through the positioning hole b upwards.

The motion guide pillar is connected to a convex sliding block in a sliding manner. The flow measurement tube is fixedly welded to the convex sliding block. The convex sliding block is driven to move up and down through a drive module.

Two ends of the telescopic guide rod are connected to load bearing telescopic lifting frames in a vertical direction through connecting fixing joints. A bottom of the load bearing telescopic lifting frame is fixed to a triangular load bearing base. An end locking stop block is also arranged at an end of the connecting fixing joint. A level gauge is arranged at an upper surface of the end locking stop block.

An ultrasonic probe b is also arranged below the positioning wing plate.

A power switch, a work indicating lamp, a fault warning lamp, a data record setting key, an operation area a configured to collect a signal of the ultrasonic probe a, an operation area b configured to collect a signal of the ultrasonic probe b, and an operation display screen are arranged on the wireless operation controller.

The ultrasonic probe b is electrically connected to the wireless operation controller.

A second technical solution adopted by the present disclosure is that, a high precision channel flow measurement method based on a principle of multi-point head loss includes: first, determining a measurement cross section; selecting flow velocity measurement control points at different positions of the cross section by using a grid division method; and finally, performing data measurement, record, and analysis on planned measurement control points in sequence by using the device: first, erecting the device at a designated cross section position to measure a water depth H of a channel cross section, inputting measurement control point parameters according to the water depth H, sequentially placing the flow measurement tubes at the measurement control points one by one, analyzing a water state of a water flow in a pipeline to obtain a flow velocity at this position, and finally comparing a plurality of groups of measurement data and calculating a cross section flow rate according to a calculation model.

Specific operation steps are as follows:

step 1: first, analyzing water potential of a channel that needs to be measured, and selecting and determining the measurement cross section;

step 2: placing the device at the designated cross section position in advance, synchronously adjusting heights of telescopic guide rods and load bearing telescopic lifting frames on two sides to safety and stably erect the load bearing telescopic lifting frames on both sides of the channel, at this moment, flow measurement tubes being positioned at top ends of motion guide pillars and being not placed in water, remaining the telescopic guide rods and the load bearing telescopic lifting frames on the same plane as the cross section, manually adjusting a leveling knob on a triangular load bearing base, and simultaneously observing whether bubbles of level gauges at the two ends of the telescopic guide rod are centered to ensure that the device remains level;

step 3: turning on a power switch of a wireless operation controller, controlling a T-shaped positioning sliding block on the wireless operation controller according to initial state information of the MCU, and adjusting flow measurement parts to slide to a flow measurement line position, wherein the flow measurement parts include flow measurement tubes, motion guide pillars, positioning wing plates, and support rods;

step 4: measuring a water depth H in a river by using ultrasonic probes b through drive modules on the positioning wing plates on two sides, performing grid division on the cross section according to the water depth H, and determining and planning measurement control points and making a record;

step 5: operating and controlling a convex sliding block to drive the flow measurement tube to slide to an underwater height calculation position downwards according to measurement control point parameters, and observing whether the bubble of the level gauge on the flow measurement tube is centered to ensure that the flow measurement tube remains in a level state during underwater measurement;

step 6: after a water flow is not affected by the installation of the device and restores to be stable, standing for a period of time, observing the liquid level heights of the Pitot tubes on both sides of a longitudinal direction of the flow measurement tube, meanwhile, measuring calculation data h by an ultrasonic probe a at a top end of the Pitot tube, and transmitting the data to the MCU through a circuit;

step 7: at a measurement line position, controlling the convex sliding block to slide to change different underwater determination heights, and repeating step 5 again to a plurality of groups of calculation data at the measurement line position;

step 8: operating and controlling the drive module, controlling the flow measurement tube to slide upward and stop after the flow measurement tube is completely above a water surface, operating and controlling the T-shaped positioning sliding block again, adjusting the telescopic guide rods and a main flow measurement part of the device to slide to a next flow measurement line position, wherein the main flow measurement part includes the flow measurement tube and the motion guide pillar;

step 9: repeating steps 5 to 7, completing measurement work on each flow measurement line position on the cross section in sequence, transmitting all calculation data to the MCU, and turning off the power switch after completion; and step 10: analyzing measured data through a calculation formula to obtain a flow measurement result.

A calculation method for the flow measurement result in step 10 is as follows:

measuring upstream and downstream water heads $h_{i1}$ and $h_{i2}$ of a measurement pipeline through the Pitot tubes, calculating to obtain a frictional head loss $h_{fi}$ of the pipeline, and calculating a cross section flow rate Q of the channel according to Q=AV;

(1) calculation of frictional head loss $$h_{fi} = h_{i1} - h_{i2} \tag{1}$$

in the formula:

$h_{fi}$ is the frictional head loss of an ith measurement point;

$h_{i1}$ and $h_{i2}$ are the water heads of the ith measurement point measured by an upstream Pitot tube and a downstream Pitot tube;

(2) flow velocity calculation 1) in a case that the material of the flow measurement tube is a steel tube or a cast iron tube, and $V_i \geq 1.2$ m/s:

$$\frac{h_{fi}}{L} = 0.00107\frac{v_i^2}{d^{1.3}} \tag{2}$$

$$v_i^2 = \frac{d^{1.3}h_{fi}}{0.00107L} \tag{3}$$

$$v_i = \sqrt{\frac{d^{1.3}h_{fi}}{0.00107L}} \tag{4}$$

$$v_i = \sqrt{\frac{d^{1.3}(h_{i1} - h_{i2})}{0.00107L}} \tag{5}$$

in a case that $V_i < 1.2$ m/s:

$$\frac{h_{fi}}{L} = 0.000912\frac{v_i^2}{d^{1.3}}\left(1 + \frac{0.867}{v_i}\right)^{0.3} \tag{6}$$

$$\frac{h_{fi}d^{1.3}}{0.000912L} = v_i^2\left(1 + \frac{0.867}{v_i}\right)^{0.3} \tag{7}$$

$$v_i = \frac{0.867}{e^{\frac{f(h_{fi},d,L)}{0.3}} - 1} \tag{8}$$

in the formula:

L is a length of a tube section;

d is an inside diameter of the tube;

$v_i$ is an average flow velocity of a water flow cross section of the ith measurement point;

$f(h_{fi}、d、L)$ is a function of $h_{fi}$, d, and L, and $$f(h_{fi}, d, L) = \ln^{\frac{h_{fi}\times d^{1.3}}{0.000912\times L}};$$

2) in a case that the flow measurement tube is an asbestos cement tube, $$\frac{h_{fi}}{L} = 0.000561\frac{v_i^2}{d^{1.190}}\left(1 + \frac{3.51}{v_i}\right)^{0.19} \quad (9)$$

$$\frac{h_{fi}\cdot d^{1.19}}{0.000561L} = v_i^2\left(1 + \frac{3.51}{v_i}\right)^{0.190} \quad (10)$$

$$v_i = \frac{3.51}{e^{\frac{f_1(h_{fi},d,L)}{0.19}} - 1} \quad (11)$$

in the formula:

$f_1(h_{fi}$、 d、 L) is a function of $h_{fi}$, d, and L, and $$f_1(h_{fi}, d, L) = \ln^{\frac{h_{fi}\times d^{1.19}}{0.000561\times L}};$$

(3) flow rate Q of flow measurement cross section $$Q = \sum_{i=1}^{n} v_i A_i \quad (12)$$

where n is the number of measurement points;

the measurement points are divided into three columns according to the cross section of the channel, and vertical measurement points are divided into two types according to the water depth H of the channel; in a case that H≥1.0 m, there are three rows of vertical measurement points, and there are nine measurement points in total; in a case that H<1.0 m, there are two rows of vertical measurement points, and there are six measurement points in total;

in a case that H≥1.0 m, calculation formulas for the area of each measurement point are:

$$\text{in a case that } i \le 3,\ A_i = \frac{H}{6}\left(\frac{2B}{3} - \frac{2i-1}{3}Hm\right) \quad (13)$$

$$\text{in a case that } 3 < i \le 6,\ A_i = \frac{HB}{9} \quad (14)$$

$$\text{in a case that } 6 < i \le 9,\ A_i = \frac{H}{6}\left(\frac{2B}{3} - \frac{2i-13}{3}Hm\right) \quad (15)$$

in a case that H<1.0 m, calculation formulas for the area of each measurement point are:

$$\text{in a case that } i \le 2,\ A_i = \frac{H}{4}\left(\frac{2B}{3} - \frac{2i-1}{2}Hm\right) \quad (16)$$

$$\text{in a case that } 2 < i \le 4,\ A_i = \frac{HB}{6} \quad (17)$$

$$\text{in a case that } 4 < i \le 6,\ A_i = \frac{H}{4}\left(\frac{2B}{3} - \frac{2i-9}{2}Hm\right) \quad (18)$$

in the formula:

Q is the flow rate of the flow measurement cross section;

$A_i$ is the area of the water flow cross section of the ith measurement point;

H is the water depth of the flow measurement cross section;

B is a width of a water surface of an upper opening of the flow measurement cross section; and m is a slope ratio of the flow measurement cross section.

The present disclosure has the following beneficial effects:

For the singularity of the principle adopted by the existing channel velocity measurement device, the present disclosure provides a new flow velocity measurement method. In addition to novel measurement principles, multi-point and multi-layer fixed point measurement can also be realized. Cross section segmentation (grid division) is used for performing comprehensive calculation, so that a measurement result is closer to an actual value, and measurement precision is ensured. Meanwhile, a transmission analysis system may select different calculation formulas according to different flow states of the flow velocity or different materials of the pipeline, and finally, the flow rate of the designated cross section is obtained according to the relationship of the flow velocity and the area of the cross section.

The measurement device has a portable structure, and a novel and unique design. The structure is easy to disassemble and assemble, and installation and maintenance operations are simple. A main support structure is made of a stainless steel material and is coated with anti-rust paint. Automatic measurement of the flow rate at a designated position of an open channel can be realized by only connecting a power supply. By the device, up and down movement in the longitudinal direction, left and right movement in a transverse direction, and quick and precise measurement of a plurality of the flow velocity of a plurality of measurement lines can be realized; a flow rate value of the cross section can be acquired within a second at the end of the measurement; meanwhile, data can be transmitted online to form an analysis file, and the flow rate of the channel can be measured concisely, quickly, and accurately. In addition, a water flow pipeline of this device may be made of a steel tube, an iron tube, or an asbestos cement tube. The requirement on the material is low. The overall device is low in cost and facilitates wide popularization better.

Figure 1:
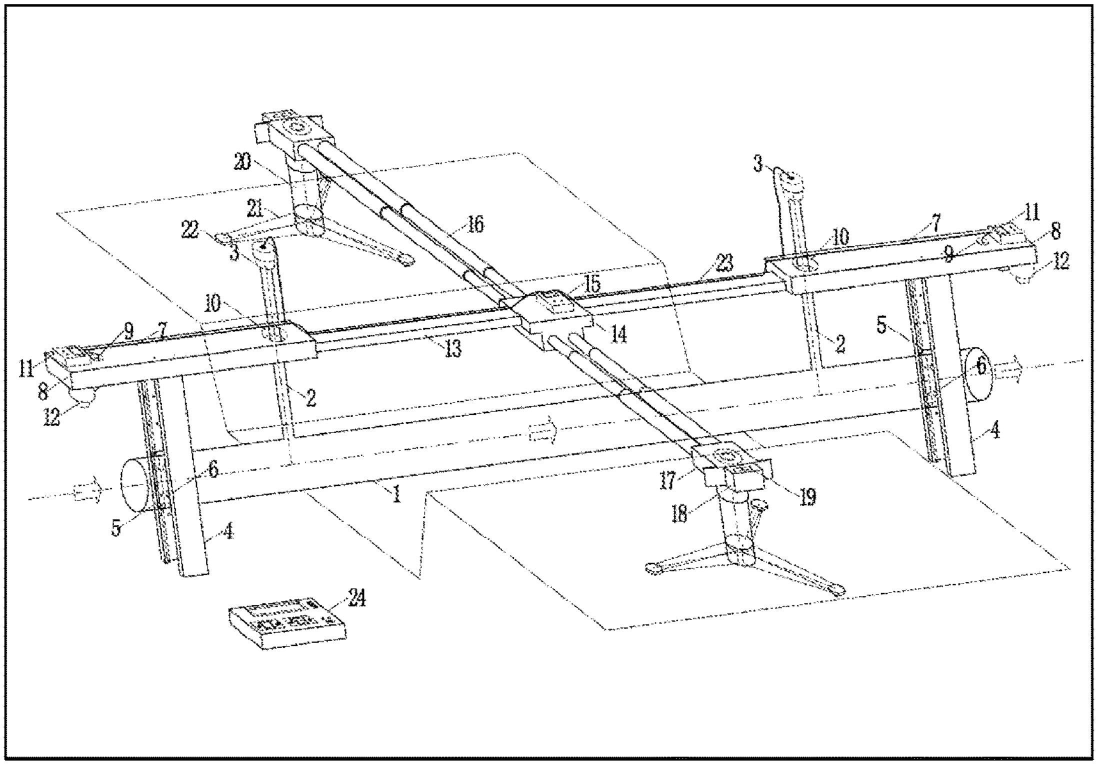
FIG. 1 is a structural diagram of an overall measurement device of the present disclosure.

In the drawings: 1: flow measurement tube, 2: Pitot tube, 3: ultrasonic probe a, 4: motion guide pillar, 5: convex sliding block, 6: fixed screw, 7: fixed knob, 8: positioning wing plate, 9: positioning hole a, 10: positioning hole b, 11: drive module, 12: ultrasonic probe b, 13: support rod, 14: T-shaped positioning sliding block, 15: MCU, 16: telescopic guide rod, 17: connecting fixing joint, 18: end locking stop block, 19: level gauge, 20: load bearing telescopic lifting frame, 21: triangular load bearing base, 22: base leveling knob, 23: lead line, 24: wireless operation controller, 24-1: power switch, 24-2: work indicating lamp, 24-3: fault warning lamp, 24-4: data record setting key, 24-5: operation area a, 24-6: operation area b, and 24-7: operation display screen.

DETAILED DESCRIPTION OF THE EMBODIMENTS

Specific implementations of the present disclosure are further described below in detail in combination with drawings and embodiments, so that technical personnel in this field can create a precise sediment content monitoring device for different areas (big rivers and the like) or monitoring cross sections (water passing channels or water drainage pipe orifices) according to the specific implementations, and can monitor the content of sediment of different grades of particle sizes at measurement points by using the device of the present disclosure.

Embodiment 1

Figure 2:
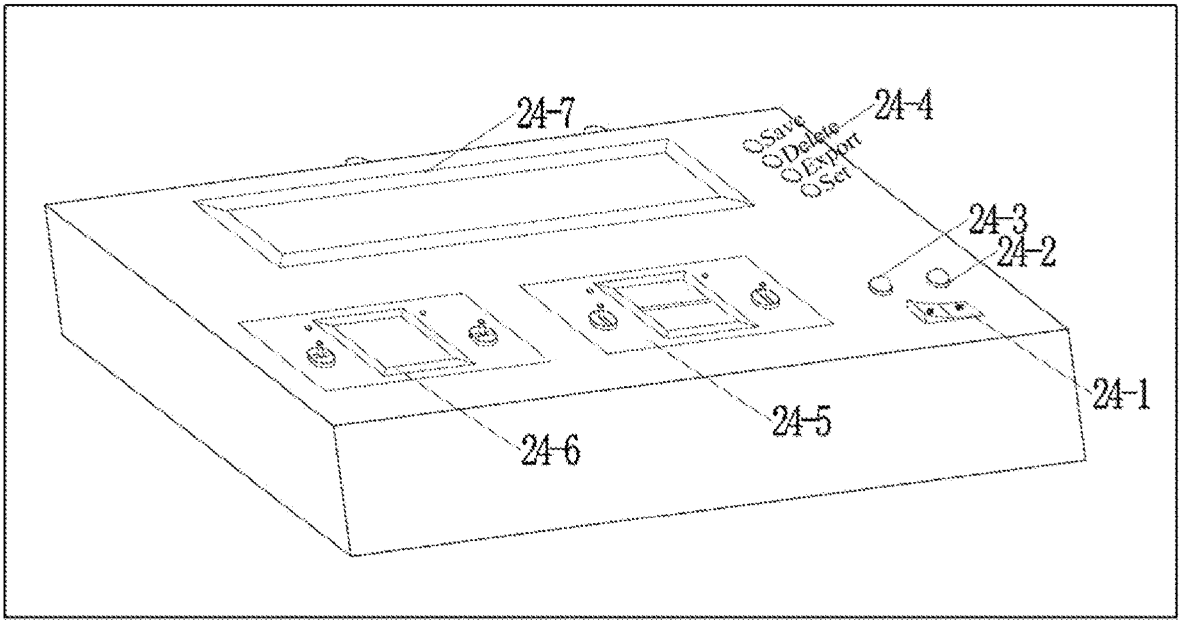
FIG. 2 is a structural diagram of a controller of a wireless operation control end of the present disclosure.

A high precision channel flow measurement device based on a principle of multi-point head loss, as shown in FIGS. 1 to 2, includes a pair of telescopic guide rods 16 that can span and be fixed to two sides of a channel and are arranged horizontally. A T-shaped positioning sliding block 14 is connected to the telescopic guide rod 16 in a sliding and sleeving manner. A support rod 13 perpendicular to the telescopic guide rod 16 is fixed to the T-shaped positioning sliding block 14. Positioning wing plates 8 are respectively fixed to two ends of the support rod 13. A motion guide pillar 4 in a vertical direction is fixed below the positioning wing plate 8. A flow measurement tube 1 parallel to the support rod 13 is arranged between the two groups of motion guide pillars 4. The flow measurement tube is communicated with two Pitot tubes 2 for measuring heights of water heads. The Pitot tube 2 vertically penetrates through the positioning wing plate 8 upwards. An ultrasonic probe a 3 is arranged at a top of the Pitot tube 2. A Micro Controller Unit (MCU) 15 is also arranged at an upper part of the T-shaped positioning sliding block 14. The MCU 15 is electrically connected to each of the ultrasonic probe a 3 and a wireless operation controller 24.

A positioning hole b 10 is formed in the positioning wing plate 8, and the Pitot tube 2 vertically penetrates through the positioning hole b 10 upwards.

The motion guide pillar 4 is connected to a convex sliding block 5 in a sliding manner. The flow measurement tube 1 is fixedly welded to the convex sliding block 5. The convex sliding block 5 is driven to move up and down through a drive module 11.

Two ends of the telescopic guide rod 16 are connected to load bearing telescopic lifting frames 20 in a vertical direction through connecting fixing joints 17. A bottom of the load bearing telescopic lifting frame 20 is fixed to a triangular load bearing base 21. An end locking stop block 18 is also arranged at an end of the connecting fixing joint 17. A level gauge 19 is arranged at an upper surface of the end locking stop block 18. The load bearing telescopic lifting frame 20 is connected to a drive device through a lead wire circuit 23 to realize stretching and retracting.

A base leveling knob 22 is also arranged at a lower part of the triangular load bearing base 21 and is configured to level the device.

An ultrasonic probe b 12 is also arranged below the positioning wing plate 8.

A positioning hole a 9 is also formed in the positioning wing plate 8. A circuit of the ultrasonic probe b 12 entering the MCU and a circuit of the convex sliding block 5 entering the drive module both penetrate through the positioning hole a 9 for fixing.

As shown in FIG. 2, a power switch 24-1, a work indicating lamp 24-2, a fault warning lamp 24-3, a data record setting key 24-4, an operation area a 24-5 configured to collect a signal of the ultrasonic probe a, an operation area b 24-6 configured to collect a signal of the ultrasonic probe b, and an operation display screen 24-7 are arranged on the wireless operation controller 24.

The ultrasonic probe b 12 is electrically connected to the wireless operation controller 24.

Embodiment 2

The high precision channel flow measurement device based on a principle of multi-point head loss of the present disclosure includes a flow measurement tube. A water body enters from one end of the flow measurement tube and flows out from the other end. A corresponding Pitot tube is arranged on the flow measurement tube to measure a height of a water head at this position, and acquires a flow velocity of the measurement point through a head loss. The flow measurement tube is welded to the convex sliding block. The convex sliding block and the motion guide pillar realize up and down sliding to complete the measurement of the flow velocity of a plurality of measurement points. One end of the motion guide pillar and a lower surface of the positioning wing plate are welded integrally. An ultrasonic probe b is arranged at one end of the positioning wing plate, and a through hole is formed in the other end to enable the Pitot tube to penetrate vertically. A drive module is arranged on an upper surface of the positioning wing plate to control the convex sliding block. Two positioning wing plates are rigidly connected through a support rod. A middle part of the support rod is connected to a telescopic guide rod through a T-shaped positioning sliding block and realizes left and right movement of the support rod. An MCU is arranged on an upper surface of the T-shaped positioning sliding block. The MCU is configured to control the drive module to drive a motor to realize linear movement of the sliding block, start and stop of ultrasonic waves, and data measurement. Two ends of the telescopic guide rod are connected to load bearing telescopic lifting frames. The load bearing telescopic lifting frames may realize up and down movement of the overall device (the overall device moves upwards to leave the water body and moves downwards to enter the water body to realize multi-point measurement). A triangular load bearing base is arranged at one end of the load bearing telescopic lifting frame. A bubble of the level gauge is centered through the base leveling knob 22, and the device is level.

The high precision channel flow measurement device based on a principle of multi-point head loss of the present disclosure can measure flow rate values of water flow cross sections of rivers and channels in different areas, and realize wireless transmission and real-time monitoring of data. The flow measurement tube, the motion guide pillar, the telescopic guide rod, and the load bearing telescopic lifting frame used in the present disclosure are all made of stainless steel. A radius of the flow measurement tube is 25 mm, and a length is 150 cm. The size of the device can be determined by technical personnel in this field according to the applicable scenarios and conditions (specifications of channels and the like) of the device during design and production. The device consists of a longitudinal movement part (including the telescopic guide rod 16 and the T-shaped positioning sliding block 15), a main flow measurement part (including the flow measurement tube 1 and the motion guide pillar 4), and a vertical movement part (including the load bearing telescopic lifting frame 20 and the triangular load bearing base 21), and can realize real-time updating of measurement results in combination with transmission and analysis to provide technical data for hydraulic calculation of channels. Through a unique structural design, the device can be adapted to various monitoring environments. The overall design is portable, and the device is easy to operate and is suitable for non-professional personnel to operate. The material of a pipeline is not limited. In summary, the device has a broad application prospect and facilitates popularization.

In addition, the flow measurement tube 1, the motion guide pillar 4, the support rod 13, and the telescopic guide rod 16, the load bearing telescopic lifting frame 20, and the triangular load bearing base 21 of the present disclosure are all detachable and splicable, which facilitates carrying and installation of technical personnel.

Embodiment 3

A high precision channel flow measurement method based on a principle of multi-point head loss of the present disclosure includes: flow velocity of a designated position is acquired by using a flow measurement tube 1; the flow measurement tube is moved in a vertical direction through a convex sliding block 5 and a motion guide pillar 4 to measure the flow velocity at different measurement points on a measurement line; an overall flow measurement part is integrally ascended, that is, the motion guide pillar 4 leaves a water body, in combination with a load bearing telescopic lifting frame 20; the overall flow measurement part integrally moves left and right in a longitudinal direction through telescopic guide rods 16 to reach a set measurement line position; the overall flow measurement part is integrally descended through the load bearing telescopic lifting frame 20, that is, the motion guide pillar 4 enters the water body to acquire the flow velocity of measurement points on different measurement lines; and a cross section flow rate is calculated according to a calculation model. Specific operations are as follows:

first, a measurement cross section is determined; flow velocity measurement control points at different positions of the cross section are selected by using a grid division method; and finally, data measurement, record, and analysis are performed on planned measurement control points in sequence by using the device: first, the device is erected at a designated cross section position to measure a water depth H of a channel cross section, measurement control point parameters are input according to the water depth H, the flow measurement tubes are sequentially placed at the measurement control points one by one, a water state of a water flow in a pipeline is analyzed to obtain the flow velocity at this position, and finally a plurality of groups of measurement data are compared and the cross section flow rate is calculated according to a calculation model.

Embodiment 4

Figure 3:
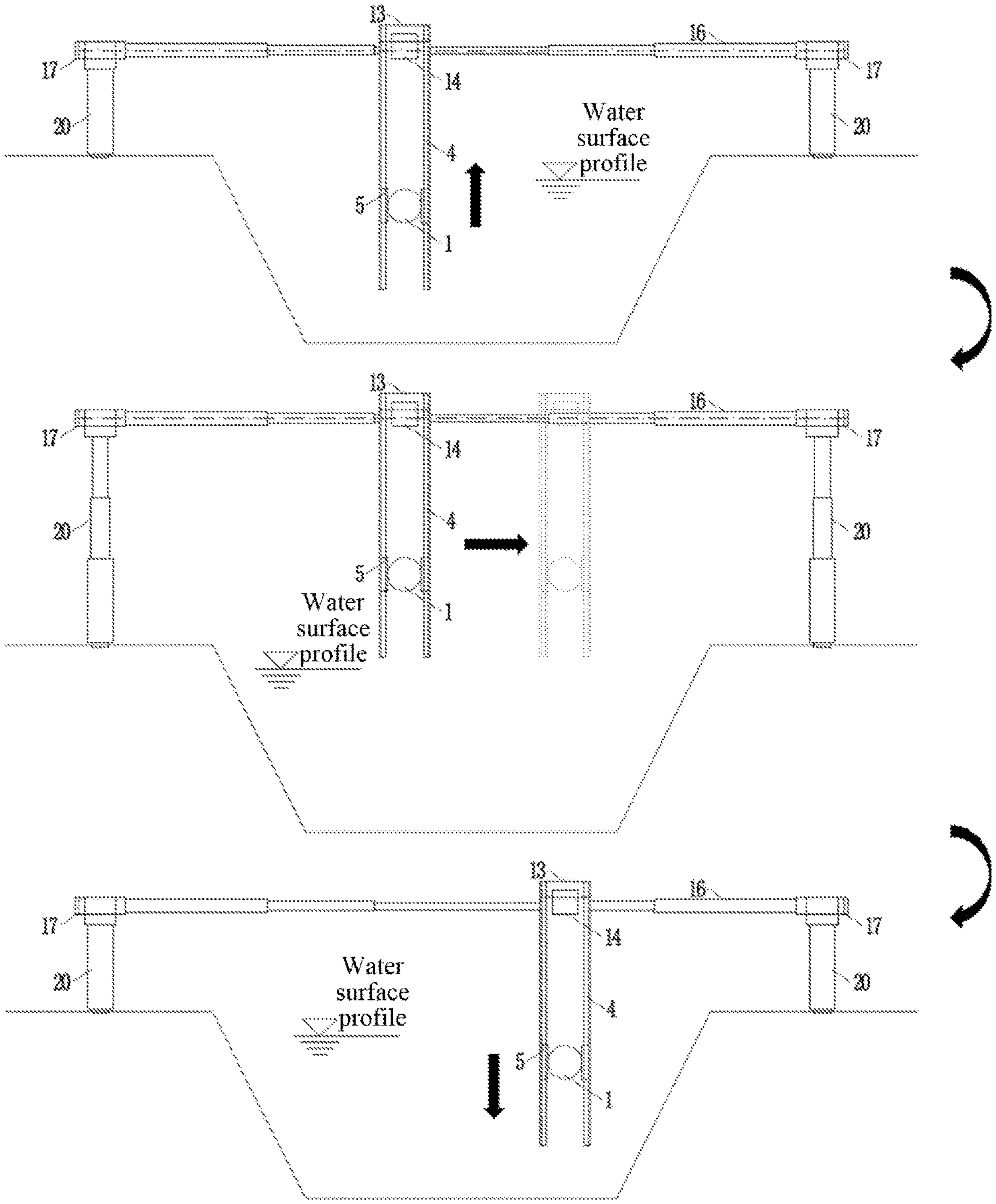
FIG. 3 is a flowchart of measurement working states at different measurement points on the same flow measurement line of the present disclosure.

A high precision channel flow measurement method based on a principle of multi-point head loss of the present disclosure, as shown in FIG. 3, specific operation steps are as follows:

step 1: first, water potential of a channel that needs to be measured is analyzed, and the measurement cross section is selected and determined;

step 2: the device is placed at the designated cross section position in advance, heights of telescopic guide rods and load bearing telescopic lifting frames on two sides are synchronously adjusted to safety and stably erect the load bearing telescopic lifting frames on both sides of the channel, at this moment, flow measurement tubes are positioned at top ends of motion guide pillars and are not placed in water, the telescopic guide rods and the load bearing telescopic lifting frames are remained on the same plane as the cross section, a leveling knob on a triangular load bearing base is manually adjusted, and simultaneously whether bubbles of level gauges at the two ends of the telescopic guide rod are centered is observed to ensure that the device remains level;

step 3: a power switch of a wireless operation controller is turned on, a T-shaped positioning sliding block is controlled on the wireless operation controller according to initial state information of the MCU, flow measurement parts are adjusted to slide to a flow measurement line position, and the flow measurement parts include flow measurement tubes, motion guide pillars, positioning wing plates, and support rods;

step 4: a water depth H in a river is measured by using ultrasonic probes b through drive modules on the positioning wing plates on two sides, grid division is performed on the cross section according to the water depth H, and measurement control points are determined and planned and a record is made;

step 5: a convex sliding block is operated and controlled to drive the flow measurement tube to slide to an underwater height calculation position downward according to parameters of a measurement control point, and whether the bubble of the level gauge on the flow measurement tube is centered is observed to ensure that the flow measurement tube remains in a level state during underwater measurement;

step 6: after a water flow is not affected by the installation of the device and restores to be stable, the device stands for a period of time, the liquid level heights of the Pitot tubes on both sides of a longitudinal direction of the flow measurement tube are observed, meanwhile, calculation data h is measured by an ultrasonic probe a at a top end of the Pitot tube, and the data is transmitted to the MCU through a circuit;

step 7: at a measurement line position, the convex sliding block is controlled to slide to change different underwater determination heights, and step 5 is repeated again to measure a plurality of groups of calculation data at the measurement line position;

step 8: operating and controlling the drive module, controlling the flow measurement tube to slide upwards and stop after the flow measurement tube is completely above a water surface, the T-shaped positioning sliding block is operated and controlled again, the telescopic guide rods and a main flow measurement part of the device are adjusted to slide to a next flow measurement line position and the main flow measurement part includes the flow measurement tubes and the motion guide pillars;

step 9: steps 5 to 7 are repeated, measurement work on each flow measurement line position on the cross section is completed in sequence, all calculation data is transmitted to the MCU, and the power switch is turned off after completion; and step 10: measured data is analyzed through a calculation formula to obtain a flow measurement result.

Figure 4:
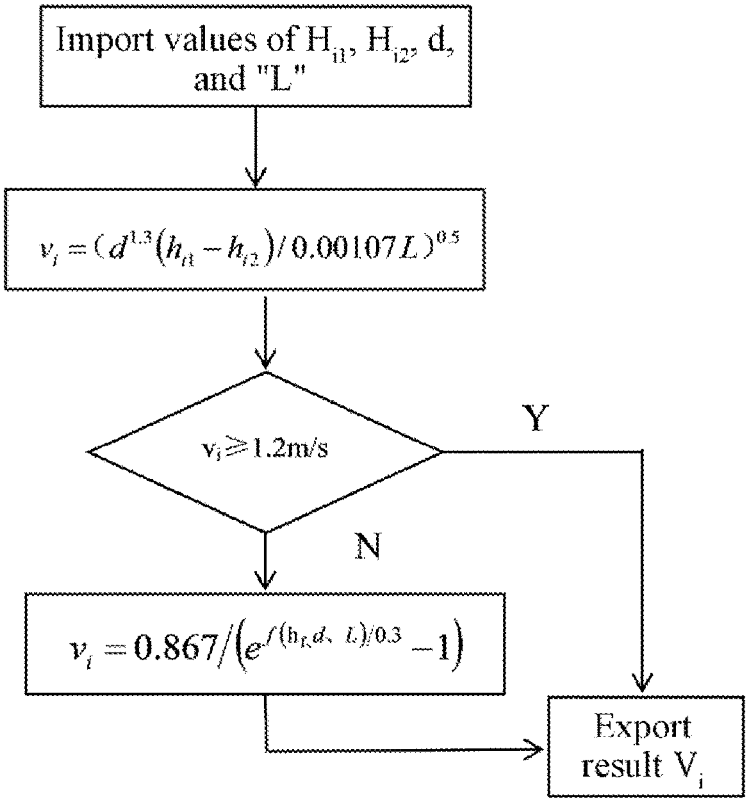
FIG. 4 is a flowchart of flow velocity calculation of the present disclosure.

Calculation of the flow measurement result in the high precision channel flow measurement method based on a principle of multi-point head loss of the present disclosure is specifically as follows:

upstream and downstream water heads $h_{i1}$ and $h_{i2}$ of a measurement pipeline are measured through the Pitot tubes, a frictional head loss $h_{fi}$ of the pipeline is calculated, and a cross section flow rate Q of the channel is calculated according to Q=AV and a Schevelev formula;

(1) calculation of the frictional head loss $$h_{fi} = h_{i1} - h_{i2} \quad (1)$$

in the formula:

$h_{fi}$ is the frictional head loss of an ith measurement point;

$h_{i1}$ and $h_{i2}$ are the water heads of the ith measurement point measured by an upstream Pitot tube and a downstream Pitot tube;

(2) flow velocity calculation 1) in a case that the material of the flow measurement tube is a steel tube or a cast iron tube, as shown in FIG. 4:

in a case that $V_i \geq 1.2$ m/s:

$$v_i = \sqrt{\frac{d^{1.3}(h_{i1} - h_{i2})}{0.00107L}} \quad (5)$$

in a case that $V_i < 1.2$ m/s:

$$v_i = \frac{0.867}{e^{\frac{f(h_{fi},d,L)}{0.3}} - 1} \quad (8)$$

in the formula:

L is a length of a tube section;

d is an inside diameter of the tube;

$v_i$ is an average flow velocity of a water flow cross section of the ith measurement point;

$f(h_{fi}$、d、L) is a function of $h_{fi}$, d, and L, and $$f(h_{fi}, d, L) = \ln^{\frac{h_{fi} \times d^{1.3}}{0.000912 \times L}};$$

3) in a case that the flow measurement tube is an asbestos cement tube, $$v_i = \frac{3.51}{e^{\frac{f_1(h_{fi},d,L)}{0.19}} - 1} \quad (11)$$

in the formula:

$f_1(h_{fi}$、d、L) is a function of $h_{fi}$, d, and L, and $$f_1(h_{fi}, d, L) = \ln^{\frac{h_{fi} \times d^{1.19}}{0.000561 \times L}};$$

Figure 5:
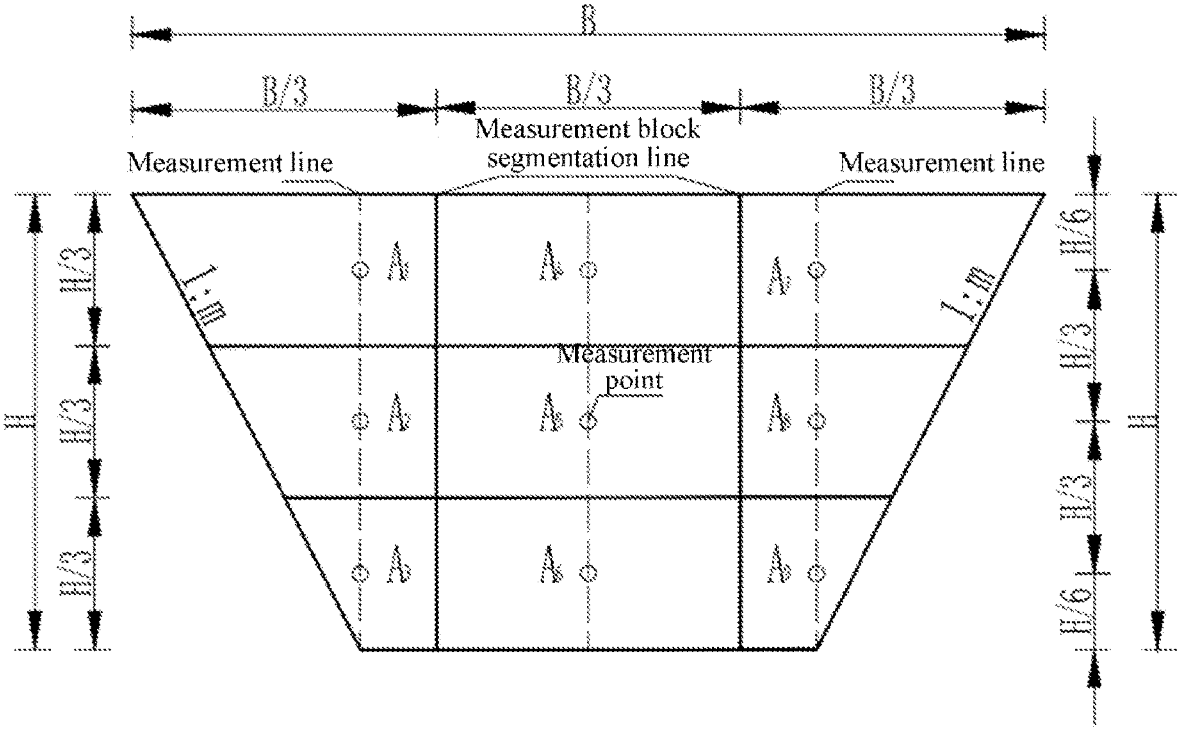
FIG. 5 is a distribution diagram of measurement points when a water depth H of a channel of the present disclosure is ≥1.0.
Figure 6:
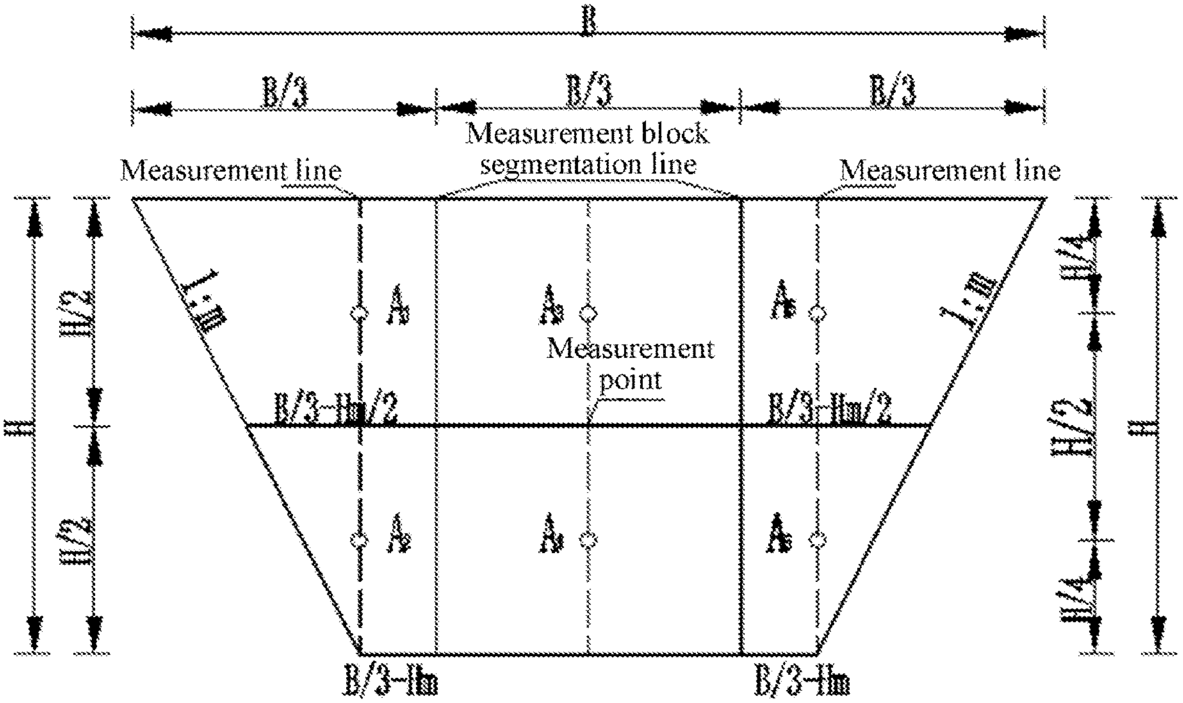
FIG. 6 is a distribution diagram of measurement points when a water depth H of a channel of the present disclosure is <1.0 m.

(3) flow rate Q of flow measurement cross section $$Q = \sum_{i=1}^{n} v_i A_i \quad (12)$$

where, n is the number of measurement points;

the measurement points are divided into three columns according to the cross section of the channel, and vertical measurement points are divided into two types according to the water depth H of the channel; in a case that H≥1.0 m, there are three rows of vertical measurement points, and there are nine measurement points in total (as shown in FIG. 5); and in a case that H<1.0 m, there are two rows of vertical measurement points, and there are six measurement points in total (as shown in FIG. 6);

in a case that H≥1.0 m, a calculation formula for the area of each measurement point is:

$$\text{in a case that } i \leq 3,\ A_i = \frac{H}{6}\left(\frac{2B}{3} - \frac{2i-1}{3}Hm\right) \quad (13)$$

$$\text{in a case that } 3 < i \leq 6,\ A_i = \frac{HB}{9} \quad (14)$$

$$\text{in a case that } 6 < i \leq 9,\ A_i = \frac{H}{6}\left(\frac{2B}{3} - \frac{2i-13}{3}Hm\right) \quad (15)$$

in a case that H<1.0 m, a calculation formula for the area of each measurement point is:

$$\text{in a case that } i \leq 2,\ A_i = \frac{H}{4}\left(\frac{2B}{3} - \frac{2i-1}{2}Hm\right) \quad (16)$$

$$\text{in a case that } 2 < i \leq 4,\ A_i = \frac{HB}{6} \quad (17)$$

$$\text{in a case that } 4 < i \leq 6,\ A_i = \frac{H}{4}\left(\frac{2B}{3} - \frac{2i-9}{2}Hm\right) \quad (18)$$

in the formula:

Q is the flow rate of the flow measurement cross section;

$V_i$ is the area of a water flow cross section of the ith measurement point;

H is the water depth of the flow measurement cross section;

B is a width of a water surface of an upper opening of the flow measurement cross section; and m is a slope ratio of the flow measurement cross section.

The innovative points of the present disclosure are that:

At present, there are various types of channel flow rate measurement devices at home and abroad, which are based on basically consistent principles, and have problems of low precision, high cost, and the like. On the basis of summarizing the above experience, this device has developed a unique approach. The innovative points of the device are summarized as follows:

(1) This device determines a flow velocity by using a mathematical relationship between the flow velocity in a pipeline and a frictional head loss, and provides a new flow velocity measurement method. The method and the principle are novel.

(2) This device can complete the measurement of the flow velocity at a designated measurement point of a measurement cross section through longitudinal and transverse movement devices, and can realize precise measurement of the cross section flow rate according to a relationship between the area of the cross section area and the flow velocity.

(3) The device can be applied to measuring the flow velocity of water flows in a plurality of flow states, and the application range is wider.

(4) The flow velocity is essentially a direct reflection of movement and migration of a bundle of fluids. The design of the flow measurement tube is to divide a water body into bundles of small fluids, which can directly reflect a true state of the flowing of the water body. For a circular pipe under a pressure flow condition, the frictional head loss and the square of the flow velocity are in a linear function. Pitot tubes are arranged at an inlet end and an outer end of the flow measurement tube, which can directly acquire the head loss of the cross section of the fluid, that is, the frictional head loss, and then acquire a flow velocity value of the cross section, which is closer to an actual value of the flowing of the water body, and has higher precision. At present, most flowmeters include a contact type and a non-contact type. The fluid at a measurement point of a contact type flowmeter is affected by the device, so it is not the actual flow velocity at the measurement point. Most non-contact type flowmeters measure the flow velocity of a surface of the water body, and further correct and calculate the flow rate of the cross section. Both the contact type flowmeters and the non-contact type flowmeters do not consider the characteristics of spontaneous movement of the fluids and have limitations in flow measurement, and the precision is difficult to fully guarantee. By using this device, these problems are greatly reduced, and the device can improve the flow measurement precision and can popularized and applied. Meanwhile, a new (a flow state being stable and close to an actual state) flow measurement method for flow measurement of a channel is also provided.

(5) The frictional head loss of a pipe flow is related to a length L of a pipe segment, an inside diameter d of the pipe segment, an average flow velocity v of a water flow cross section of the pipe segment, and a frictional head loss coefficient λ, and λ is related to a roughness coefficient of the pipeline. Different pipe materials have different roughness coefficients, so the water flows at the same flow velocity will produce different head losses after passing through measurement pipes made of different pipe materials. Therefore, different calculation formulas are selected for different pipe materials.

The above describes a basic principle and main features of the present disclosure and advantages of the present disclosure. The present disclosure is not limited by the above implementations. The above implementations only describe the principle of the present disclosure. There will be various changes and improvements in the present disclosure without departing from the spirit and scope of the present disclosure. All of these changes and improvements fall within the scope of protection of the present disclosure. The scope of protection required by the present disclosure is defined by the attached claims and their equivalents.

What is claimed is:

1. A high precision channel flow measurement device based on a principle of multi-point head loss, comprising:

a pair of telescopic guide rods (16), wherein a T-shaped positioning sliding block (14) is connected to the pair of telescopic guide rods (16) in a sliding and sleeving manner;

a support rod (13) perpendicular to the pair of telescopic guide rods (16) is fixed to the T-shaped positioning sliding block (14);

positioning wing plates (8) are respectively fixed to two ends of the support rod (13);

two motion guide pillars (4) in a vertical direction are respectively fixed below each of the positioning wing plates (8);

a flow measurement tube (1) parallel to the support rod (13) is arranged between the two motion guide pillars (4);

the flow measurement tube is communicated with two Pitot tubes (2) for measuring heights of water heads;

the Pitot tubes (2) vertically penetrate through the positioning wing plates (8) upwards;

two ultrasonic probes a (3) are respectively arranged at each top of the two Pitot tubes (2);

a Micro Controller Unit (MCU) (15) is also arranged at an upper part of the T-shaped positioning sliding block (14); and the MCU (15) is electrically connected to each of the two ultrasonic probes a (3) and a wireless operation controller (24).

2. The high precision channel flow measurement device based on a principle of multi-point head loss according to claim 1, wherein a positioning hole b (10) is formed in each of the positioning wing plates (8); and the two Pitot tubes (2) each vertically penetrate through the respective positioning hole b (10) upwards.

3. The high precision channel flow measurement device based on a principle of multi-point head loss according to claim 1, wherein the two motion guide pillars (4) are respectively connected to two convex sliding blocks (5) in a sliding manner; the flow measurement tube (1) is fixedly welded to the two convex sliding blocks (5); and the co two convex sliding blocks (5) are driven to move up and down respectively through drive modules (11).

4. The high precision channel flow measurement device based on a principle of multi-point head loss according to claim 2, wherein each end of the pair of telescopic guide rods (16) are connected to load bearing telescopic lifting frames (20) in a vertical direction through connecting fixing joints (17); a bottom of each of the load bearing telescopic lifting frames (20) is fixed to a triangular load bearing base (21); an end locking stop block (18) is also arranged at an end of the connecting fixing joint (17); and a level gauge (19) is arranged at an upper surface of the end locking stop block (18).

5. The high precision channel flow measurement device based on a principle of multi-point head loss according to claim 1, wherein an ultrasonic probe b (12) is also arranged below each of the positioning wing plates (8).

6. The high precision channel flow measurement device based on a principle of multi-point head loss according to claim 1, wherein a power switch (24-1), a work indicating lamp (24-2), a fault warning lamp (24-3), a data record setting key (24-4), an operation area a (24-5) configured to collect a signal of the two ultrasonic probes a, an operation area b (24-6) configured to collect a signal of an ultrasonic probe b, and an operation display screen (24-7) are arranged on the wireless operation controller (24).

7. The high precision channel flow measurement device based on a principle of multi-point head loss according to claim 1, wherein an ultrasonic probe b (12) is electrically connected to the wireless operation controller (24).

8. A high precision channel flow measurement method based on a principle of multi-point head loss, using the high precision channel flow measurement device based on a principle of multi-point head loss according to claim 1, and comprising:

first, determining a measurement cross section by erecting the high precision channel flow measurement device at a designated cross section position to measure a water depth H of a channel cross section;

selecting flow velocity measurement control points at different positions of the cross section by using a grid division method and inputting measurement control point parameters according to the water depth H; and finally, performing data measurement, record, and analysis on planned measurement control points in sequence by using the high precision channel flow measurement device by:

sequentially placing the flow measurement tube at the measurement control points, analyzing a water state of a water flow in a pipeline to obtain a flow velocity at this position, and comparing a plurality of groups of measurement data and calculating a cross section flow rate according to a calculation model.

9. The high precision channel flow measurement device based on a principle of multi-point head loss according to claim 8, wherein specific operation steps are as follows:

step 1: first, analyzing water potential of a channel that needs to be measured, and selecting and determining the measurement cross section;

step 2: placing the high precision channel flow measurement device at the designated cross section position in advance, synchronously adjusting heights of the pair of telescopic guide rods and load bearing telescopic lifting frames on two sides to safely and stably erect the load bearing telescopic lifting frames on both sides of the channel, at this moment, the flow measurement tube being positioned at top ends of the two motion guide pillars and being not placed in water, manually adjusting a leveling knob on a triangular load bearing base, and simultaneously observing whether bubbles of level gauges at each end of the pair of telescopic guide rods are centered to ensure that the high precision channel flow measurement device remains level;

step 3: turning on a power switch of the wireless operation controller, controlling the T-shaped positioning sliding block on the wireless operation controller according to initial state information of the MCU, and adjusting flow measurement parts to slide to a flow measurement line position, wherein the flow measurement parts comprise the flow measurement tube, the two motion guide pillars, the positioning wing plates, and the support rod;

step 4: measuring a water depth H in a river by using ultrasonic probes b through drive modules on the positioning wing plates on two sides, performing grid division on the cross section according to the water depth H, and determining and planning measurement control points and making a record;

step 5: operating and controlling a convex sliding block to drive the flow measurement tube to slide to an underwater height calculation position downward according to measurement control point parameters, and observing whether the bubble of the level gauge on the flow measurement tube is centered to ensure that the flow measurement tube remains in a level state during underwater measurement;

step 6: after a water flow is not affected by the installation of the high precision channel flow measurement device and restores to be stable and standing for a period of time, observing the liquid level heights of the two Pitot tubes on both sides of a longitudinal direction of the flow measurement tube and measuring calculation data h by the two ultrasonic probes a at each top end of the two Pitot tubes, and transmitting the data to the MCU through a circuit;

step 7: at a measurement line position, controlling the convex sliding block to slide to change different underwater determination heights, and repeating step 5 again to measure a plurality of groups of calculation data at the measurement line position;

step 8: operating and controlling the drive module, controlling the flow measurement tube to slide upwards and stop after the flow measurement tube is completely above a water surface, operating and controlling the T-shaped positioning sliding block again, and adjusting the pair of telescopic guide rods and a main flow measurement part of the high precision channel flow measurement device to slide to a next flow measurement line position, wherein the main flow measurement part comprises the flow measurement tube and the two motion guide pillars;

step 9: repeating steps 5 to 7, completing measurement work on each flow measurement line position on the cross section in sequence, transmitting all calculation data to the MCU, and turning off the power switch after completion; and step 10: analyzing measured data through a calculation formula to obtain a flow measurement result.

10. The high precision n channel flow measurement device based on a principle of multi-point head loss according to claim 9, wherein a calculation method for the flow measurement result in step 10 is as follows:

measuring upstream and downstream water heads $h_{i1}$ and $h_{i2}$ of a measurement pipeline through the Pitot tubes, calculating to obtain a frictional head loss $h_{fi}$ of the pipeline, and calculating a cross section flow rate Q of the channel according to Q=AV, wherein A is an area of a water flow cross section and V is an average flow velocity of the water flow cross section;

(1) calculation of frictional head loss $$h_{fi} = h_{i1} - h_{i2} \tag{1}$$

in the formula:

$h_{fi}$ is the frictional head loss of an ith measurement point;

$h_{i1}$ and $h_{i2}$ are the water heads of the ith measurement point measured by an upstream Pitot tube and a downstream Pitot tube;

(2) flow velocity calculation 1) in a case that the material of the flow measurement tube is a steel tube or a cast iron tube, and $$v_i = \sqrt{\frac{d^{1.3}(h_{i1} - h_{i2})}{0.00107\ L}} \tag{5}$$

in a case that $v_i<1.2$ m/s:

$$v_i = \frac{0.867}{e^{\frac{f(h_{fi}, d, L)}{0.3}} - 1} \tag{8}$$

in the formula:

L is a length of a tube section;

d is an inside diameter of the tube;

$v_i$ is an average flow velocity of the water flow cross section of the ith measurement point;

$f(h_{fi}, d, L)$ is a function of $h_{fi}$, d, and L, and $$f(h_{fi}, d, L) = \ln\frac{h_{fi}\times d^{1.3}}{0.000912\times L};$$

2) In a case that the flow measurement tube is an asbestos cement tube, $$v_i = \frac{3.51}{e^{\frac{f_1(h_{fi}, d, L)}{0.19}} - 1} \tag{11}$$

in the formula:

$f_1(h_{fi}, d, L)$ is a function of $h_{fi}$, d, and L, and $$f_1(h_{fi}, d, L) = \ln\frac{h_{fi}\times d^{1.19}}{0.000561\times L};$$

(3) flow rate Q of flow measurement cross section $$Q = \sum_{i=1}^{n} v_i A_i \tag{12}$$

wherein n is the number of measurement points;

the measurement points are divided into three columns according to the cross section of the channel, and vertical measurement points are divided into two types according to the water depth H of the channel; in a case that H≥1.0 m, there are three rows of vertical measurement points, and there are nine measurement points in total; in a case that H<1.0 m, there are two rows of vertical measurement points, and there are six measurement points in total;

in a case that H≥1.0 m, calculation formulas for the area of each measurement point are:

$$\text{in a case that } i \le 3,\ A_i = \frac{H}{6}\left(\frac{2B}{3} - \frac{2i-1}{3}Hm\right) \tag{13}$$

$$\text{in a case that } 3 < i \le 6,\ A_i = \frac{HB}{9} \tag{14}$$

$$\text{in a case that } 6 < i \le 9,\ A_i = \frac{H}{6}\left(\frac{2B}{3} - \frac{2i-13}{3}Hm\right) \tag{15}$$

in a case that H<1.0 m, calculation formulas for the area of each measurement point are:

$$\text{in a case that } i \le 2,\ A_i = \frac{H}{4}\left(\frac{2B}{3} - \frac{2i-1}{2}Hm\right) \tag{16}$$

$$\text{in a case that } 2 < i \le 4,\ A_i = \frac{HB}{6} \tag{17}$$

$$\text{in a case that } 4 < i \le 6,\ A_i = \frac{H}{4}\left(\frac{2B}{3} - \frac{2i-9}{2}Hm\right) \tag{18}$$

in the formula:

Q is the flow rate of the flow measurement cross section;

$A_i$ is the area of the water flow cross section of the ith measurement point;

H is the water depth of the flow measurement cross section;

B is a width of a water surface of an upper opening of the flow measurement cross section; and m is a slope ratio of the flow measurement cross section.

* * * * *